「12」 United States Patent
Hunkeler

(10) Patent No.: US 7,408,900 B2
(45) Date of Patent: Aug. 5, 2008

(54) METHOD AND SYSTEM FOR AUTOMATED DETERMINATION OF INTER-SYSTEM BORDER THRESHOLDS

(75) Inventor: Teresa Hunkeler, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 1023 days.

(21) Appl. No.: 10/601,786

(22) Filed: Jun. 23, 2003

(65) Prior Publication Data

US 2004/0008647 A1 Jan. 15, 2004

Related U.S. Application Data

(60) Provisional application No. 60/392,596, filed on Jun. 28, 2002.

(51) Int. Cl.
*H04Q 7/00* (2006.01)
(52) U.S. Cl. .................. 370/331; 370/332; 370/280; 455/67.11
(58) Field of Classification Search ......... 370/280–332; 455/67.11
See application file for complete search history.

(56) References Cited

U.S. PATENT DOCUMENTS

| 5,594,949 | A | * | 1/1997 | Andersson et al. | 455/437 |
|---|---|---|---|---|---|
| 5,737,703 | A | | 4/1998 | Byrne | |
| 6,078,570 | A | | 6/2000 | Czaja et al. | |
| 6,111,864 | A | | 8/2000 | Kabasawa | |
| 6,490,452 | B1 | * | 12/2002 | Boscovic et al. | 455/436 |
| 6,611,507 | B1 | * | 8/2003 | Hottinen et al. | 370/331 |
| 6,615,044 | B2 | * | 9/2003 | Tigerstedt et al. | 455/437 |
| 6,845,238 | B1 | * | 1/2005 | Muller | 455/436 |
| 7,116,647 | B2 | * | 10/2006 | Uebayashi et al. | 370/329 |
| 7,133,673 | B2 | * | 11/2006 | Zeira et al. | 455/436 |
| 2001/0055288 | A1 | * | 12/2001 | Uebayashi et al. | 370/331 |
| 2002/0105913 | A1 | * | 8/2002 | Miya | 370/241 |
| 2004/0053614 | A1 | * | 3/2004 | Il-Gyu et al. | 455/436 |
| 2004/0092232 | A1 | * | 5/2004 | Zeira et al. | 455/67.11 |
| 2007/0054620 | A1 | * | 3/2007 | Zeira et al. | 455/63.1 |

FOREIGN PATENT DOCUMENTS

| EP | 0946076 | 9/1999 |
|---|---|---|
| EP | 0948231 | 10/1999 |
| EP | 1 077 582 | 2/2001 |
| EP | 1077582 | 2/2001 |

(Continued)

OTHER PUBLICATIONS

3GPP TS 25.225, "Third Generation Partnership Project; Technical Specification Group Radio Access Network; Physical Layer—Measurements (TDD)", V5.0.0, Release 5, Mar. 2002.

(Continued)

*Primary Examiner*—Chi H. Pham
*Assistant Examiner*—Phuc Tran
(74) *Attorney, Agent, or Firm*—Volpe and Koenig, P.C.

(57) ABSTRACT

A method and system for determining thresholds for evaluating inter-system handovers in a wireless communication system includes determining a quality level of a first digital duplexing type, determining a quality level of a second digital duplexing type, and comparing the quality levels to determine whether to handover from the first digital duplexing type to the second duplexing type.

19 Claims, 2 Drawing Sheets

FOREIGN PATENT DOCUMENTS

| | | |
|---|---|---|
| KR | 2001-41393 | 5/2001 |
| WO | 00/36867 | 6/2000 |
| WO | 00/41429 | 7/2000 |
| WO | 01/10159 | 2/2001 |
| WO | 01/20942 | 3/2001 |

OTHER PUBLICATIONS

3GPP TS 25.225, "Third Generation Partnership Project; Technical Specification Group Radio Access Network; Physical Layer - Measurements (TDD)", V5.0.0, Release 5, Mar. 2002.

3rd Generation Partnership Project (3GPP); Technical Specification Group (TSG) Radio Access Network (RAN); Working Group 1 (WG1); Physical layer - Measurements; TS 25.231 V0.3.0 (1999-06).

Universal Mobile Telecommunications System (UMTS); Radio Resource Control (RRC) protocol specification (3GPP TS 25.331 version 4.8.0 Release 4) ETSI TS 125 331 V4.8.0 (2002-12), Section 14.2.1.

3rd Generation Partnership Project, "Technical Specification Group Radio Access Network; Physical Layer—Measurements (TDD) (Release 5)," 3GPP TS 25.225 v5.0.0 (Mar. 2002).

3rd Generation Partnership Project, "Technical Specification Group Radio Access Network; Working Group 1; Physical Layer—Measurements," 3GPP TS 25.231 v0.3.0 (Jun. 1999).

3rd Generation Partnership Project, "Technical Specification Group Radio Access Network; Radio Resource Control (RCC); Protocol Specification (Release 4)," 3GPP TS 25.331 V4.8.0 (Dec. 2002).

* cited by examiner

METHOD AND SYSTEM FOR AUTOMATED DETERMINATION OF INTER-SYSTEM BORDER THRESHOLDS

CROSS REFERENCE TO RELATED APPLICATION

This application claims priority from U.S. Provisional Application No. 60/392,596, filed on Jun. 28, 2002, which is incorporated by reference as if fully set forth.

BACKGROUND

The present invention relates to wireless communication networks having systems with overlapping coverage areas. More specifically, the present invention relates to inter-system handovers within wireless communication networks.

Referring to FIG. 1, there is shown a Universal Mobile Telecommunications System using Time Division Duplex 10 (hereinafter "TDD system") overlapping a wider-area Universal Mobile Telecommunications System using Frequency Division Duplex 12 (hereinafter "FDD system"). FIG. 2 shows the opposite scenario, of an FDD system 12 overlapping a wider-area TDD system 10. Handover between the two systems 10, 12 is possible, but requires that measurements be made by wireless transmit and receive units (WTRUs) and that those measurements be forwarded to the radio network controller (RNC), which performs the handover decision.

Event 2b, as defined in "3GPP TS 25.331 V4.8.0 3rd Generation Partnership Project; Technical Specification Group Radio Access Network; Radio Resource Control (RRC); Protocol Specification (Release 4)", dated December 2002 (hereinafter, "the Standard"), may be used when performing an inter-system handover (i.e., a handover between a TDD system 10 and a FDD system 12). Event 2b is defined in the Standard as an event where "the estimated quality of the currently used frequency is below a certain threshold and the estimated quality of a non-used frequency is above a certain threshold." It is important to note that the non-used frequency is always a frequency of the system to which a WTRU will be handed over. Therefore, evaluation of inter-system handovers (i.e., handovers between TDD and FDD systems) using Event 2b requires two thresholds: (1) the minimum quality condition for the TDD system 10 and (2) the minimum quality condition for the FDD system 12.

The minimum quality condition for the TDD system 10 is based on the received signal code power (RSCP) of the primary common control physical channel (PCCPCH; hereinafter collectively referred to as "P-CCPCH RSCP"). The minimum quality condition for the FDD system 12 may be based on either the RSCP of the common pilot channel (CPICH; hereinafter collectively referred to as the "CPICH RSCP") or the signal-to-noise ratio (Ec/No) of the common pilot channel (CPICH; hereinafter collectively referred to as "CPICH Ec/No").

These minimum quality values are highly dependent on the particular deployment (e.g., Manhattan microcell deployment), and could possibly be set manually for each cell in a TDD/FDD border area. The interference patterns are different in the different deployments. For example, the standard deviation of lognormal fading has different values for different deployments, which is higher for microcells than for urban areas in general. Also, the multipath interference is different for different deployments. This means that while the quality level of a beacon of −105 dBm is sufficient to support communication in one cell due to low interference, it may not be sufficient to support communication in another cell, because the interference might be higher. In order to permit ease of administration, it is of interest to provide an automated method and system for determining the thresholds needed for evaluating inter-system handovers.

SUMMARY

The invention is a method and system for automated determination of inter-system border thresholds. The automated determination of thresholds is utilized to perform handover decisions between TDD and FDD systems.

A first preferred method of the present invention for determining thresholds for evaluating inter-system handovers in a wireless communication system includes determining a quality level of a first digital duplexing type, determining a quality level of a second digital duplexing type, and comparing the quality levels to determine whether to handover from the first digital duplexing type to the second digital duplexing type.

Another preferred method of the present invention includes first determining a first minimum quality level for a first duplexing type and a second duplexing type. Next, the first minimum quality level is compared with a first threshold and the second minimum quality level is compared with a second threshold. Lastly, a handover from the first duplexing type to the second duplexing type is initiated if the first minimum quality level is below the first threshold and the second minimum quality level is above the second threshold.

A system constructed in accordance with the present invention for determining thresholds for evaluating inter-system handovers between a first duplexing type and a second duplexing type in a wireless communications system includes a plurality of multimode WTRUs capable of operating in both the first duplexing type and the second duplexing type. The system also includes an RNC having setting means for setting a minimum quality level for the first duplexing type, instructing means for instructing each of the WTRUs to report the extent of coverage of the second duplexing type, and deciding means for deciding whether to handover a WTRU from the first duplexing type to the second duplexing type. Lastly, the system includes at least one base station communicating between the plurality of WTRUs and the RNC.

DETAILED DESCRIPTION OF THE PREFERRED EMBODIMENTS

Figure 1:
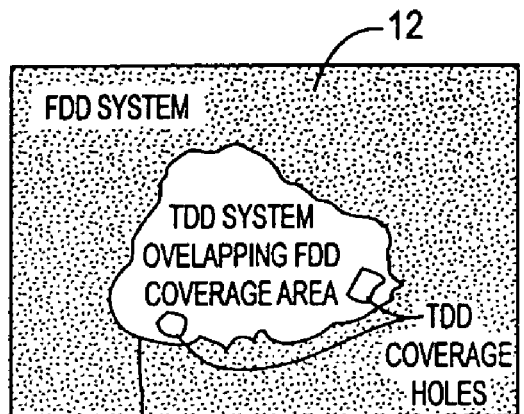
FIG. 1 is a diagram showing an UMTS-TDD system overlapping a wider-area FDD system.

Referring again to FIG. 1 and initially to handovers from TDD systems 10 to FDD systems 12 (i.e., TDD-FDD handovers), handovers not only occur on TDD-FDD borders, but they also occur internally within the TDD system 10 on internal TDD-TDD cell borders. These handovers are triggered based on the relative P-CCPCH RSCP levels of the TDD cells. The P-CCPCH RSCP level at which handover occurs out of one TDD cell into another TDD cell will depend on cell planning and will indicate the limits of the cell coverage.

The minimum quality level of the TDD system 10 (i.e., the threshold used to evaluate the estimated quality of the currently used frequency) may be referred to as the TDD minimum quality level or the TDD threshold value. This threshold value may be inferred from the P-CCPCH RSCP level which is used for the internal TDD-TDD handovers. That is, the TDD threshold value, which is used for handovers on TDD-FDD borders may be, for example, the average value of the P-CCPCH RSCP values that were used as a threshold for evaluating TDD-TDD handovers in a TDD system 10. The TDD threshold value does not necessarily have to be an average but may be a percentile, for example, the $95^{th}$ percentile.

The extent of the FDD coverage 12 overlapping/bordering the TDD cells may be determined by having multimode (i.e. TDD and FDD) WTRUs report the levels of FDD coverage to the RNC. Event 2c, which is also part of the Standard, may be used to define the extent of FDD coverage as wherever "the estimated quality of a non-used frequency is above a certain threshold." As mentioned, in this scenario, the non-used frequency is an FDD frequency. The FDD threshold value can therefore be derived based on the information reported by the multimode WTRUs.

There are different cases where it may be desired to set the handover threshold different from the reporting threshold. The reporting threshold represents the minimum quality that can sustain a communication. The estimated quality may be higher than this. For example, the reporting threshold may be −105 dBm, and the estimated quality may be −80 dBm. The derivation of the handover threshold is based on the desired system performance, and may be additionally based on the load of the TDD system. The cases are:

(1) Handover to FDD is desired even if the FDD signal quality is low. This may be due to a preference for FDD service, or a high load in the TDD system. In this case, the handover threshold will be set to the reporting threshold (e.g., −105 dBm), as long as that value has been reported.

(2) Handover to FDD is desired only in regions where the estimated quality is reported as being high. In this case, the handover threshold will be set to a higher value, as long as that value has been reported (e.g., −85 dBm).

In order to obtain a signal on a non-used frequency, the WTRUs are informed of which additional frequencies to measure by the RNC. The WTRUs are not using these frequencies for communication, but are capable of measuring them. In the case of TDD, the non-used frequencies are measured during timeslots that are not used for communication. In the case of FDD, the non-used frequencies are measured during compressed mode.

Figure 2:
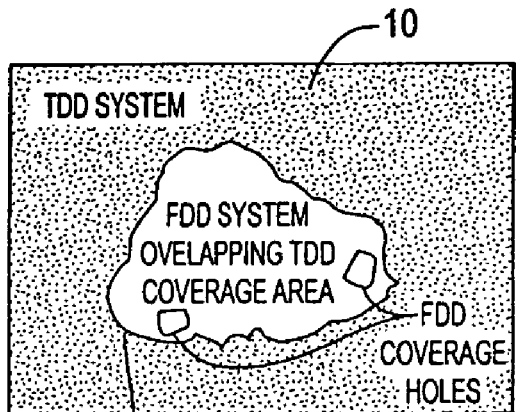
FIG. 2 is a diagram showing an UMTS-FDD system overlapping a wider-area TDD system.

Referring now to FIG. 2 and to handovers from FDD systems 12 to TDD systems 10 (i.e., FDD-TDD handovers), handovers not only occur on FDD-TDD borders, but they also occur internally within the FDD system 12 on FDD-FDD cell borders. These handovers are triggered based on the relative quality levels (either CPICH RSCP or CPICH Ec/No) of the FDD cells. The level at which handover occurs out of one FDD cell into another FDD cell will depend on the cell planning, and will indicate the limits of the cell coverage.

The minimum quality levels of the FDD system 12 (i.e., the threshold value used to evaluate the estimated quality of the currently used frequency) may be referred to as the FDD minimum quality level or the FDD threshold value. This threshold value may be inferred from the particular internal quality level chosen for evaluating FDD-FDD handovers. That is, the FDD threshold value, which is used for handovers on FDD-TDD borders may be, for example, the average internal quality levels that were used as a threshold for evaluating FDD-FDD handovers in a FDD system 12. The FDD threshold value does not necessarily have to be an average but may be a percentile, for example the $95^{th}$ percentile.

The extent of the TDD coverage 10 overlapping/bordering the FDD cells can be determined by having multimode WTRUs report the levels of TDD coverage to the RNC. Event 2c may also be used here to define the extent of TDD coverage as wherever the estimated quality of the non-used frequency, which in this case will be a TDD frequency, is above a certain threshold. Therefore, the TDD threshold value can be derived based on the information provided by the multimode WTRUs. Deriving the TDD threshold value is performed in the same manner as deriving the FDD threshold value, as described above. It is to be noted that there is no accommodation for availability of bandwidth on either FDD or TDD. However, the handover threshold may be set due to the load in the system, as stated above.

Figure 3:
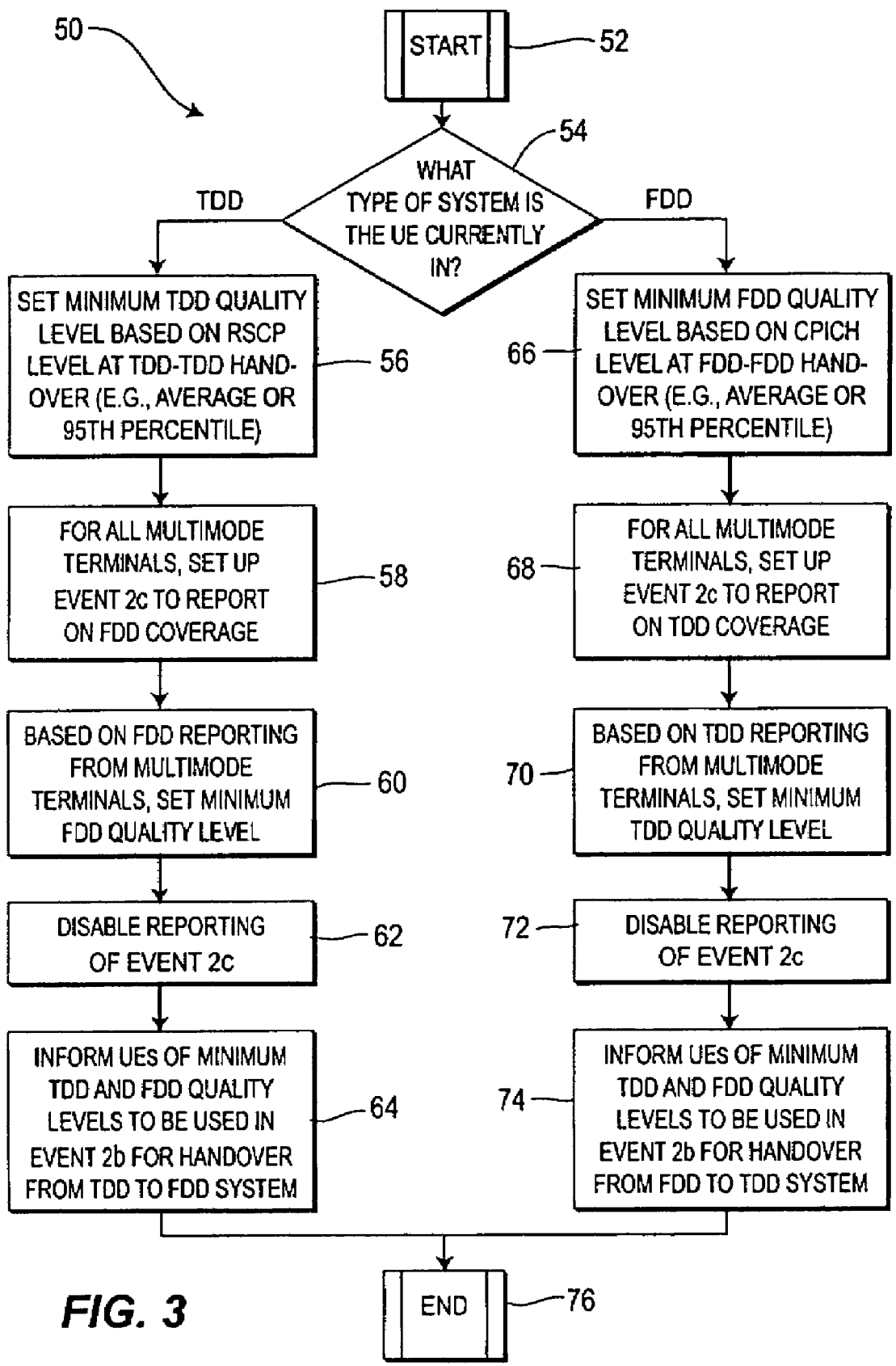
FIG. 3 is a flowchart of a method for determining the thresholds necessary for evaluating handovers between TDD and FDD systems.

Referring now to FIG. 3, there is shown a flowchart of a method 50 for determining the thresholds necessary for evaluating TDD-FDD and FDD-TDD handovers. The method 50 begins with step 52 and proceeds to step 54 to determine the type of system in which the WTRU being evaluated for handover is currently operating. For purposes of describing the invention, two types of systems (i.e., TDD and FDD) are shown, but it is important to note that the method 50 may be implemented for any number and/or type of system(s) utilized in conjunction with a wireless communication network.

If the WTRU is currently operating in a TDD system, the method 50 proceeds to step 56. In steps 56-64, the thresholds for evaluating TDD-FDD handovers are determined. First, in step 56, a minimum TDD quality level is set based on the PCCPCH RSCP used for the internal TDD-TDD handovers. The minimum TDD quality level may be, for example, an average or percentile (e.g., $95^{th}$ percentile), depending on operator preference. Once the minimum TDD quality level is set, the method 50 proceeds to step 58. In step 58, Event 2c is set up for all multimode WTRUs to report on the extent of FDD coverage within the TDD system. In step 60, the minimum FDD quality level is set based on the FDD reporting from the multimode WTRUs. In step 62, reporting of Event 2c is disabled. In step 64, the WTRUs are informed of the minimum TDD and FDD quality levels which may be used in Event 2b for evaluating whether TDD-FDD handovers may occur.

If the WTRU is currently operating in a FDD system, the method 50 proceeds from step 54 to step 66. In steps 66-74, the thresholds for evaluating FDD-TDD handovers are determined. First, in step 66, a minimum FDD quality level is set. The minimum FDD quality level may be based on the CPICH RSCP or CPICH Ec/No, depending on which one is being used for evaluating the internal FDD-FDD handovers. The minimum FDD quality level may be, for example, an average or percentile (e.g., $95^{th}$ percentile), depending on operator preference. Once the minimum FDD quality level is set, the method 50 proceeds to step 68. In step 68, Event 2c is set up for all multimode WTRUs to report on the extent of TDD coverage within the FDD system. In step 70, the minimum TDD quality level is set based on the TDD reporting from the multimode WTRUs. In step 72, reporting of Event 2c is disabled. In step 74, the WTRUs are informed of the minimum TDD and FDD quality levels which may be used in Event 2b for evaluating whether FDD-TDD handovers may occur.

Once the appropriate quality levels have been provided (i.e., from either step 64 or step 74), the method 50 ends at step 76. Method 50 may be performed as desired whenever quality levels for evaluating inter-system handovers are needed.

Figure 4:
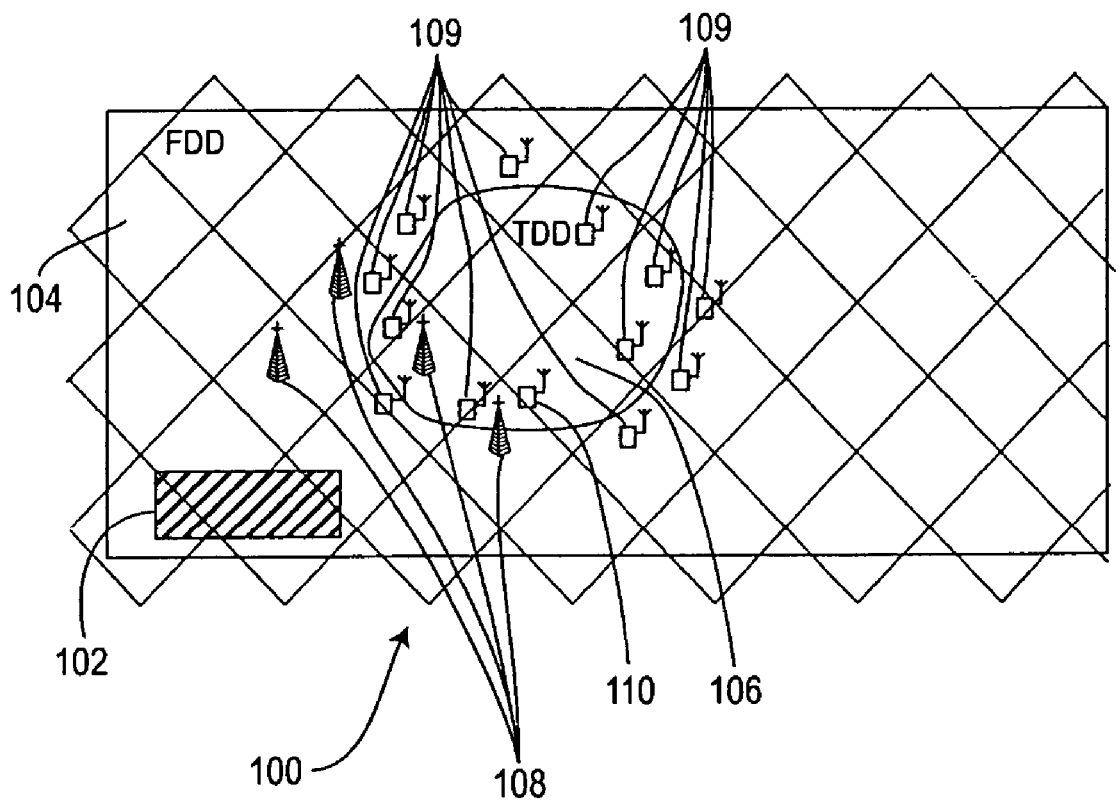
FIG. 4 is a diagram of a system wherein thresholds are automatically determined for use in evaluating handover between TDD and FDD systems.

Referring now to FIG. 4, there is shown a diagram of a system 100 for providing thresholds for evaluating inter-system handovers. For purposes of describing the system 100, a TDD system 106 overlapping a wider-area FDD system 104 is shown. The system comprises at least one radio network controller (RNC) 102, a plurality of base stations 108, and a plurality of multimode WTRUs (i.e., user equipment) 109.

To further illustrate the system 100, there is shown a multimode WTRU 110 which is a candidate for a handover from TDD to FDD (i.e., a TDD-FDD handover). In this example, it is assumed that the WTRU 110 is operating in the TDD system, but is being evaluated for handover to the FDD system. To evaluate the handover, the RNC 102 sets a minimum TDD quality level based on the P-CCPCH-RSCP that was used for internal TDD-TDD handovers. The RNC 102 will also instruct all of the multimode WTRUs 109, 110 to report the extent of FDD coverage. The threshold used for determining the extent of FDD coverage is used as the minimum FDD quality level. Once the RNC 102 has both of the necessary quality levels, they are forwarded to the WTRU 110. The WTRU 110 then uses the quality levels to determine if Event 2b is satisfied. If Event 2b is satisfied, the WTRU 110 will be handed over from TDD to FDD. If not, the WTRU 110 will remain in TDD mode.

Although the present invention has been described in detail, it is to be understood that the invention is not limited thereto, and that various changes can be made therein while remaining within scope of the invention, which is defined by the attached claims.

What is claimed is:

1. A method for determining thresholds for evaluating handovers in a wireless communication network, the method comprising:
   determining a quality level of a first digital duplexing type based on the threshold value for intra-system handover of the first digital duplexing type;
   determining a quality level of a second digital duplexing type based on the coverage report from a plurality of multi-mode wireless transmit/receive units (WTRUs); and
   comparing the quality levels to determine whether to handover from the first digital duplexing type to the second duplexing type;
   initiating a handover from the first duplexing type to the second duplexing type if the first quality level is below a first threshold and the second quality level is above a second threshold.

2. The method of claim 1, wherein a WTRU is operating in the first digital duplexing type and the quality level of the first digital duplexing type is determined by using primary channel signal levels.

3. The method of claim 2, wherein the quality level of the second digital duplexing type is determined using secondary channel signal levels derived from an estimated quality of a non-used frequency.

4. The method of claim 1, wherein the first digital duplexing type is time division duplex and the second digital duplexing type is frequency division duplex.

5. The method of claim 1, wherein the first digital duplexing type is frequency division duplex and the second digital duplexing type is time division duplex.

6. The method of claim 1, wherein the first quality level of the first digital duplexing type is based on a received signal code power of a primary common control physical channel; and
   the second quality level of the second digital duplexing type is based on information provided by a WTRU regarding the extent of coverage of the second digital duplexing type.

7. A method for determining thresholds for evaluating handovers between a first duplexing type and a second duplexing type in a wireless communications network, the method comprising:
   determining a first minimum quality level for the first duplexing type based on a threshold value for intra-system handover of the first digital duplexing type;
   determining a second minimum quality level for the second duplexing type based on a coverage report received from a plurality of multi-mode wireless transmit/receive units (WTRUs);
   comparing the first minimum quality level with a first threshold and comparing the second minimum quality level with a second threshold; and
   initiating a handover from the first duplexing type to the second duplexing type if the first minimum quality level is below the first threshold and the second minimum quality level is above the second threshold.

8. The method of claim 7, wherein the first threshold is an average of the first minimum quality level values, and the second threshold is an average of the second minimum quality level values.

9. The method of claim 7, wherein the first threshold and the second threshold are percentile values.

10. The method of claim 7, wherein the first duplexing type is Time Division Duplex and the second duplexing type is Frequency Division Duplex.

11. The method of claim 10, wherein determining a first minimum quality level includes calculating a received signal code power of a primary common control physical channel.

12. The method of claim 10, wherein determining a second minimum quality level includes calculating a received signal code power of a common pilot channel.

13. The method of claim 10, wherein determining a second minimum quality level includes calculating a signal-to-noise ratio of a common pilot channel.

14. The method of claim 7, wherein the first duplexing type is Frequency Division Duplex and the second duplexing type is Time Division Duplex.

15. The method of claim 14, wherein determining a first minimum quality level includes calculating a received signal code power of a common pilot channel.

16. The method of claim 14, wherein determining a first minimum quality level includes calculating a signal-to-noise ratio of a common pilot channel.

17. The method of claim 14, wherein determining a second minimum quality level includes calculating a received signal code power of a primary common control physical channel.

18. The method of claim 7, wherein the first duplexing type and the second duplexing type are the same, and the handover is between different cells of the same duplexing type.

19. A radio network controller (RNC) for determining thresholds for handovers between a first duplexing type and a second duplexing type, the RNC comprising:
 a receiver configured to receive from a wireless transmit/receive unit (WTRU) a report of the extent of coverage of the second duplexing type;
 processor configured to set a first minimum quality level for the first duplexing type, and to decide whether to handover a WTRU from the first duplexing type to the second duplexing type if the first minimum quality level for the first duplexing type is below a first threshold and a second minimum quality level for the second duplexing type is above a second threshold.

* * * * *

UNITED STATES PATENT AND TRADEMARK OFFICE
CERTIFICATE OF CORRECTION

PATENT NO. : 7,408,900 B2  Page 1 of 1
APPLICATION NO. : 10/601786
DATED : August 5, 2008
INVENTOR(S) : Teresa Hunkeler It is certified that error appears in the above-identified patent and that said Letters Patent is hereby corrected as shown below:

At claim 1, column 5, line 39, before the word "quality", insert --first--.

At claim 1, column 5, line 42, before the word "quality", insert --second--.

At claim 1, column 5, line 45, delete "and".

At claim 1, column 5, line 48, after the word "type;", insert --and--.

At claim 2, column 5, line 55, before the word "quality", insert --first--.

At claim 3, column 5, line 58, before the word "quality", insert --second--.

At claim 19, column 7, line 7, before the word "processor", insert --a--.

Signed and Sealed this

Twenty-third Day of December, 2008

JON W. DUDAS
*Director of the United States Patent and Trademark Office*